(12) United States Patent
Naito

(10) Patent No.: US 7,418,070 B2
(45) Date of Patent: Aug. 26, 2008

(54) SIGNAL GENERATOR

(75) Inventor: Masashi Naito, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 483 days.

(21) Appl. No.: 11/078,563

(22) Filed: Mar. 14, 2005

(65) Prior Publication Data

US 2005/0265476 A1 Dec. 1, 2005

(30) Foreign Application Priority Data

Jun. 1, 2004 (JP) ............................. 2004-162715

(51) Int. Cl.
 *H03D 3/24* (2006.01)
(52) U.S. Cl. .................. 375/373; 375/371; 375/354; 370/503; 370/304
(58) Field of Classification Search ................ 375/296, 375/295, 297, 298, 316, 129, 373, 371, 354; 370/503, 304
See application file for complete search history.

(56) References Cited

U.S. PATENT DOCUMENTS

| 6,845,082 B2* | 1/2005 | Bourget et al. ............. 370/210 |
| 6,982,965 B2* | 1/2006 | Itahara et al. ............... 370/317 |
| 2002/0105947 A1* | 8/2002 | Kitagawa et al. ........... 370/366 |
| 2002/0150038 A1* | 10/2002 | Sumasu et al. ............. 370/208 |
| 2004/0097201 A1* | 5/2004 | Yoon .......................... 455/103 |
| 2004/0233836 A1* | 11/2004 | Sumasu et al. ............. 370/206 |
| 2005/0129140 A1* | 6/2005 | Robinson .................... 375/297 |
| 2006/0189282 A1* | 8/2006 | Hasegawa et al. ......... 455/127.1 |
| 2007/0098109 A1* | 5/2007 | Vadde et al. ................ 375/297 |

FOREIGN PATENT DOCUMENTS

| JP | A 07-143098 | 6/1995 |
| JP | A 08-340361 | 12/1996 |
| JP | A 2002-305489 | 10/2002 |
| JP | A 2003-283460 | 10/2003 |

* cited by examiner

*Primary Examiner*—Shuwang Liu
*Assistant Examiner*—Kenneth Lam
(74) *Attorney, Agent, or Firm*—Oliff & Berridge, PLLC

(57) ABSTRACT

In a signal generator, a peak value/peak position detection section detects value and position of an amplitude peak observed in modulation data coming from an orthogonal modulation section, and a peak carrier extraction section extracts L subcarriers capable of minimizing such an amplitude peak. A peak carrier generation section generates peak suppression data corresponding to thus extracted subcarriers, and a subtraction section subtracts the peak suppression data from the modulation data. A transmission signal generation section generates an analog transmission signal from the modulation data, and a peak suppression section generates an analog peak suppression signal from the peak suppression data. A signal synthesis section synthesizes the transmission signal and the peak suppression signal, and sends out the synthesis result to a wireless communications line via a transmission antenna. With such a structure, any amplitude peak found in a multicarrier transmission signal can be successfully suppressed.

1 Claim, 15 Drawing Sheets

Related Art

SIGNAL GENERATOR

BACKGROUND OF THE INVENTION

Description of the Related Art

Field of the Invention

A method for suppressing an amplitude increase that is possibly observed in multicarrier signals including OFDM (Orthogonal Frequency Division Multiplex) and others is found in Patent Documents 1 to 4, for example.

The issue here is that the methods described in Patent Documents 1 to 4 require an amplifier of larger size and higher power consumption, widen the signal bandwidth after amplitude suppression, and invite data errors.

[Patent Document 1] JP-A-2003-283460
[Patent Document 2] JP-A-2002-305489
[Patent Document 3] JP-A-8-340361
[Patent Document 4] JP-A-7-143098

SUMMARY OF THE INVENTION

The present invention is proposed in consideration of the above circumstances, and an object thereof is to provide a signal generator capable of generating multicarrier signals while effectively suppressing amplitude increases without widening signal bandwidth, generating spurious signals, or inviting data errors.

Another object of the present invention is to provide a multicarrier communications device and a peak power suppression method in the device both capable of suppressing signal peak voltages without upsizing the device or increasing the power consumption.

In order to achieve the above objects, a first aspect of the present invention is directed to a signal generator that includes: first data generation means for generating first digital data including a plurality of modulated subcarriers for transmission; second data generation means for generating second digital data corresponding to the subcarriers that cause an amplitude increase to a signal as a result of converting the first digital data into analog; third data generation means for generating third data by subtracting the second digital data from the first digital data; first signal generation means for generating a first signal by converting the second digital data into an analog signal; second signal generation means for generating a second signal by converting the third data into an analog signal; and signal synthesis means for synthesizing the first and second signals.

A second aspect of the present invention is directed to a signal generator that includes: first data generation means for generating first digital data including a plurality of modulated subcarriers for transmission; second data generation means for generating second digital data corresponding to the subcarriers that cause an amplitude increase to a signal as a result of converting the first digital data into analog; third data generation means for generating third data by subtracting the second digital data from the first digital data; first signal generation means for generating a first signal by converting the second digital data into an analog signal; second signal generation means for generating a second signal by converting the third data into an analog signal; and two antenna means for emitting the first and second signals, respectively, to derive signal overlay in a space.

A third aspect of the present invention is directed to a signal generator that includes: first data generation means for generating first digital data including a plurality of modulated subcarriers for transmission; first addition means for adding digital control data to the first digital data; second data generation means for generating second digital data corresponding to the subcarriers that cause an amplitude increase to a signal as a result of converting the first digital data added with the control data into analog; second addition means for adding control data of an inverse phase to the second digital data; third data generation means for generating third data by subtracting the second digital data from the first digital data added with the control data; adjustment means for adjusting the second digital data added with the control data of the inverse phase; first signal generation means for generating a first signal by converting the adjusted second digital data into an analog signal; second signal generation means for generating a second signal by converting the third data into an analog signal; third signal generation means for generating a third signal by synthesizing the first and second signals; and detection means for detecting a control signal being included in the third signal and corresponding to the control data. In the signal generator, the adjustment means adjusts the amplitude and phase of the second digital data attached with the control of the inverse phase based on the detected control signal.

According to the present invention, the signal generator can successfully generate multicarrier signals while effectively suppressing amplitude increases without widening signal bandwidth or inviting data errors.

Moreover, according to the present invention, the signal generator is capable of suppressing signal peak voltages without upsizing the device or increasing the power consumption.

DESCRIPTION OF THE PREFERRED EMBODIMENTS (General OFDM Transmitter)

Prior to describing embodiments of the present invention, for the sake of clarity, described first is an OFDM transmitter 8 of a general type.

Figure 1:
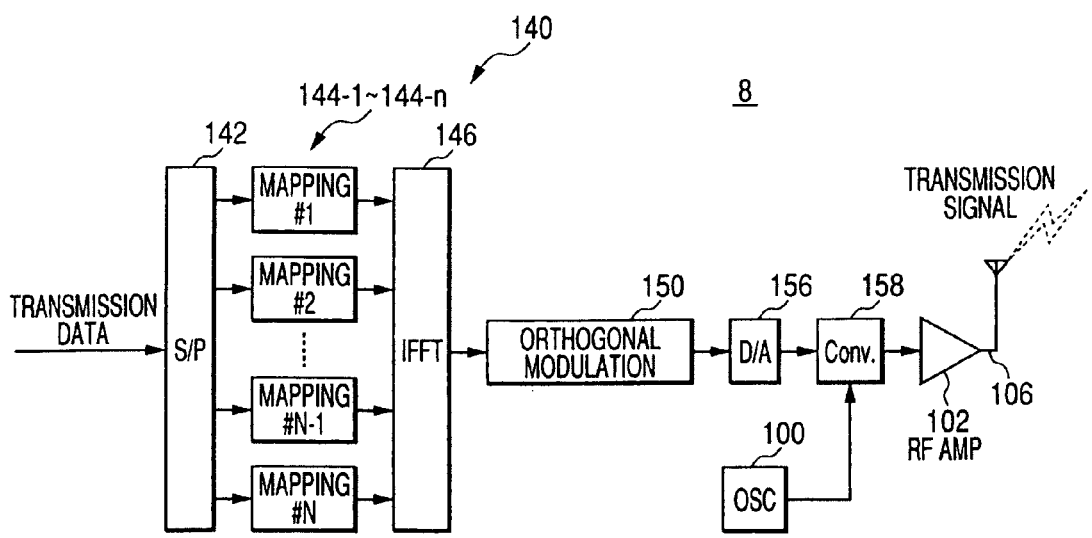
FIG. 1 is a diagram showing the structure of a general OFDM transmitter.

FIG. 1 is a diagram showing the structure of such a general OFDM transmitter 8.

As shown in FIG. 1, the OFDM transmitter 8 includes a mapping/Inverse Fast Fourier Transform (IFFT) section 140, an orthogonal modulation section 150, a digital/analog (D/A) conversion section 156, a frequency conversion section (Conv.) 158, a local signal generation section (OSC) 100, a radio-frequency power amplifier (RF-AMP) 102; and a transmission antenna 106.

The mapping/IFFT section 140 is provided with a serial/parallel (S/P) conversion section 142, N (where N is an integer) mapping sections $144_1$ to $144_N$, and an IFFT section 146.

With such components, the OFDM transmitter 8 transmits transmission data coming from outside toward a wireless communications line while generating an OFDM transmission signal.

Hereinafter, as to any plural components such as the mapping sections $144_1$ to $144_N$ when there is no need to specify which, those may be collectively referred to as the mapping section 144, for example.

In the accompanying drawings, any components substantially the same are provided with the same reference numeral.

In the mapping/IFFT section 140, the S/P conversion section 142 converts incoming transmission data from serial to parallel.

Also in the mapping/IFFT section 140, thus parallel-converted transmission data is divided into N digital symbols, where N is the number corresponding to the modulation technique. The resulting N digital symbols are forwarded to their corresponding mapping sections $144_1$ to $144_N$.

Assuming that the OFDM transmitter 8 applies the modulation technique of BPSK (Binary Phase Shift Keying), the digital symbols of the transmission data each have a bit.

Similarly, assuming that the OFDM transmitter 8 applies the modulation technique of 16 QAM (Quadrature Amplitude Modulation), the digital symbols of the transmission data each have 4 bits.

The mapping sections $144_1$ to $144_N$ map their corresponding digital symbols coming from the S/P conversion section 142 to signal points. The signal points as a result of such mapping are forwarded to the IFFT section 146.

The IFFT section 146 executes an IFFT process to the signal points coming from the mapping sections $144_1$ to $144_N$ so that N subcarriers (carrier signals) are modulated by the N digital symbols. As a result of modulation as such, an IFFT sample (OFDM symbol data) is generated for output to the orthogonal modulation section 150.

The orthogonal modulation section 150 subjects the IFFT sample to orthogonal modulation, and outputs the modulation result to the D/A conversion section 156 as modulation data.

The D/A conversion section 156 converts incoming digital data to an analog transmission signal, and outputs the resulting transmission signal to the frequency conversion section 158.

This transmission signal includes the N subcarriers derived through BPSK or 16 QAM.

The frequency conversion section 158 uses a local signal coming from the local signal generation section 100 to convert the frequency of the incoming transmission signal, and outputs the conversion result to the RF-AMP 102.

The RF-AMP 102 power-amplifies the transmission signal coming from the frequency conversion section 158, and outputs the result toward a wireless communications line through the transmission antenna 106.

Figure 2:
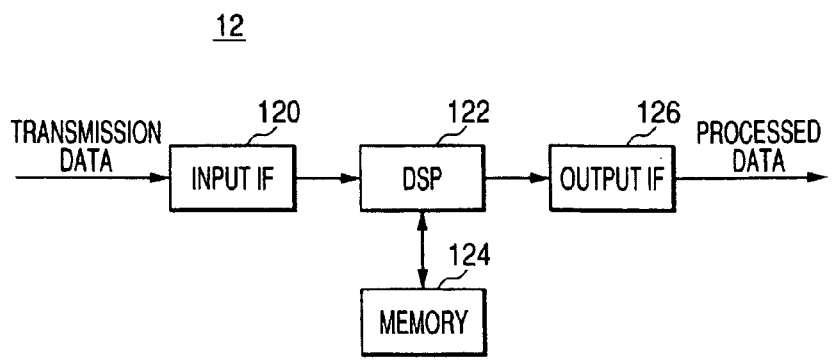
FIG. 2 is a diagram showing an exemplary structure of a Digital Signal Processor (DSP) circuit for possible use in the OFDM transmitter.

FIG. 2 is a diagram exemplarily showing the structure of a Digital Signal Processor (DSP) circuit 12 for possible use in the OFDM transmitter.

As shown in FIG. 2, the DSP circuit 12 includes an input interface circuit (input IF) 120, a DSP 122, memory 124 exemplified by RAM or ROM, an output IF 126, and others. The DSP circuit 12 processes, at high speed, digital data coming through the input IF 120, and outputs the result through the output IF 126.

Note here that the components of the OFDM transmitter 8 may be implemented by any hardware specifically designed for the purpose, or by software using the DSP circuit 12 of FIG. 2. In the OFDM transmitter 8, for example, the mapping/IFFT section 140 and the orthogonal modulation section 150 may be implemented by software processing using the DSP circuit 12. This is applicable also to other OFDM transmitters of the accompanying drawings.

As described in the foregoing, the transmission data to be generated by the OFDM transmitter 8 includes the N subcarriers as a modulation result by the N digital symbols, those of which are derived by serial-parallel conversion applied to the transmission data.

The issue here is that such subcarriers in the OFDM transmission signal have no correlation thereamong, and thus many of the subcarriers may have the same phase. If such subcarriers of the same phase are overlaid on one another in the transmission signal, this causes a large increase in amplitude in the transmission signal.

Figure 3:
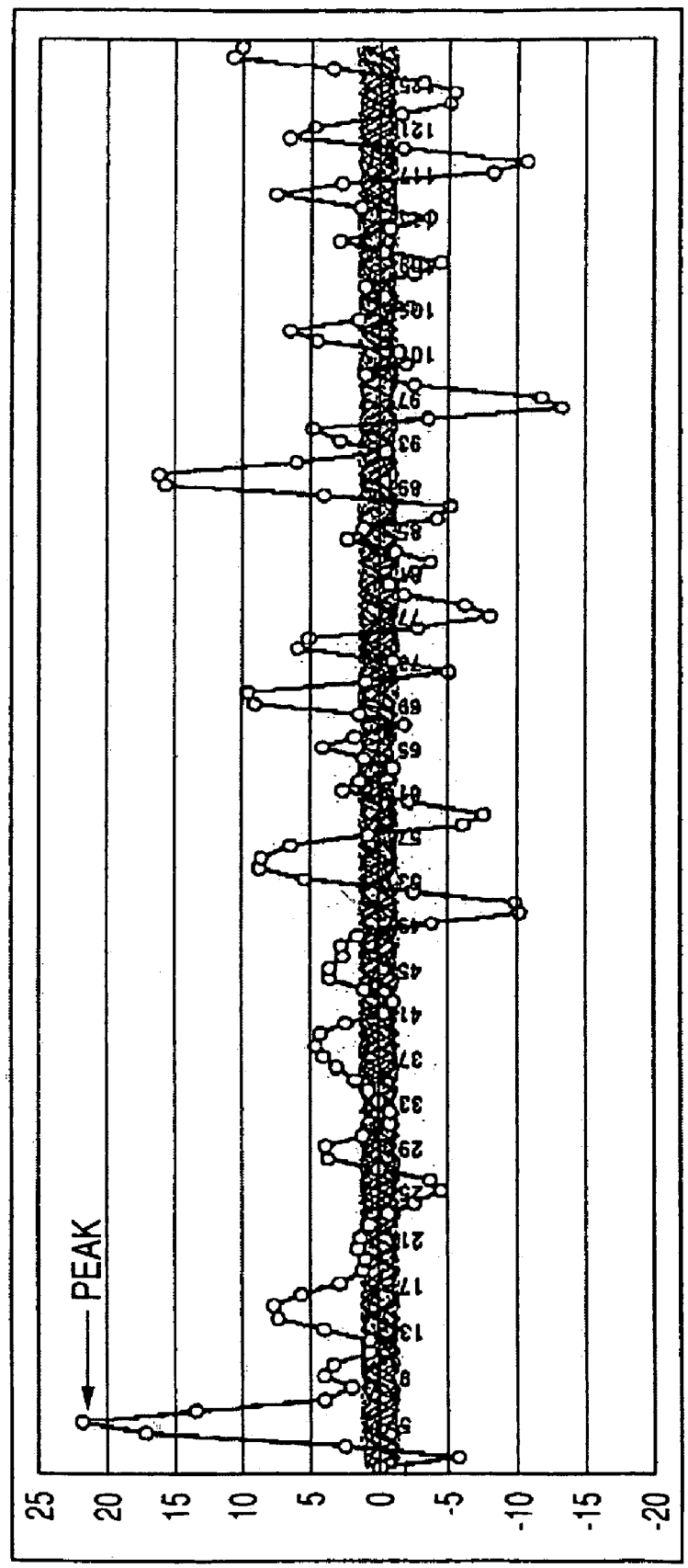
FIG. 3 is a diagram exemplarily showing a transmission signal to be generated by the OFDM transmitter of FIG. 1 and a subcarrier included in the signal.

FIG. 3 is a diagram exemplarily showing a transmission signal to be generated by the OFDM transmitter 8 of FIG. 1 and a subcarrier included in the signal.

In FIG. 3, exemplified is a case where a transmission signal includes 32 subcarriers whose frequency is orthogonal, i.e., the frequency being an integral submultiple of an IFFT frame will be 0 by frame integration, showing the orthogonal relationship. These subcarriers are each represented as a sine wave of the phase corresponding to a digital symbol assigned thereto.

Although a subcarrier is small in amplitude, if many subcarriers share the same phase, it causes a large increase in amplitude in a transmission signal because the subcarriers of the same phase are overlaid on one another as described above.

When an incoming transmission signal to the RF-AMP 102 is right in amplitude, the signal will be amplified characteristically in a nonlinear region of the RF-AMP 102, whereby an output signal does not suffer from distortion that much.

When the amplitude exceeds a range that is considered appropriate for an incoming signal, the amplitude increase is amplified in the nonlinear region of the RF-AMP 102, whereby an output signal of the resulting part will suffer a large nonlinear distortion.

Such a nonlinear distortion is a cause of a spurious transmission signal.

To prevent such nonlinear distortion, possible measures are to upsize the RF-AMP 102 to provide it with durability against any incoming signals of large amplitude. With this being the case, however, the RF-AMP 102 will be increased in power consumption and the amount of heat.

Other possible measures are to limit the amplitude of any transmission signals to be provided to the RF-AMP 102 not to exceed a predetermined upper limit value. Such amplitude limitation, however, resultantly causes large nonlinear distortion.

FIRST EMBODIMENT

In the below, described now is a first embodiment of the present invention.

Figure 4:
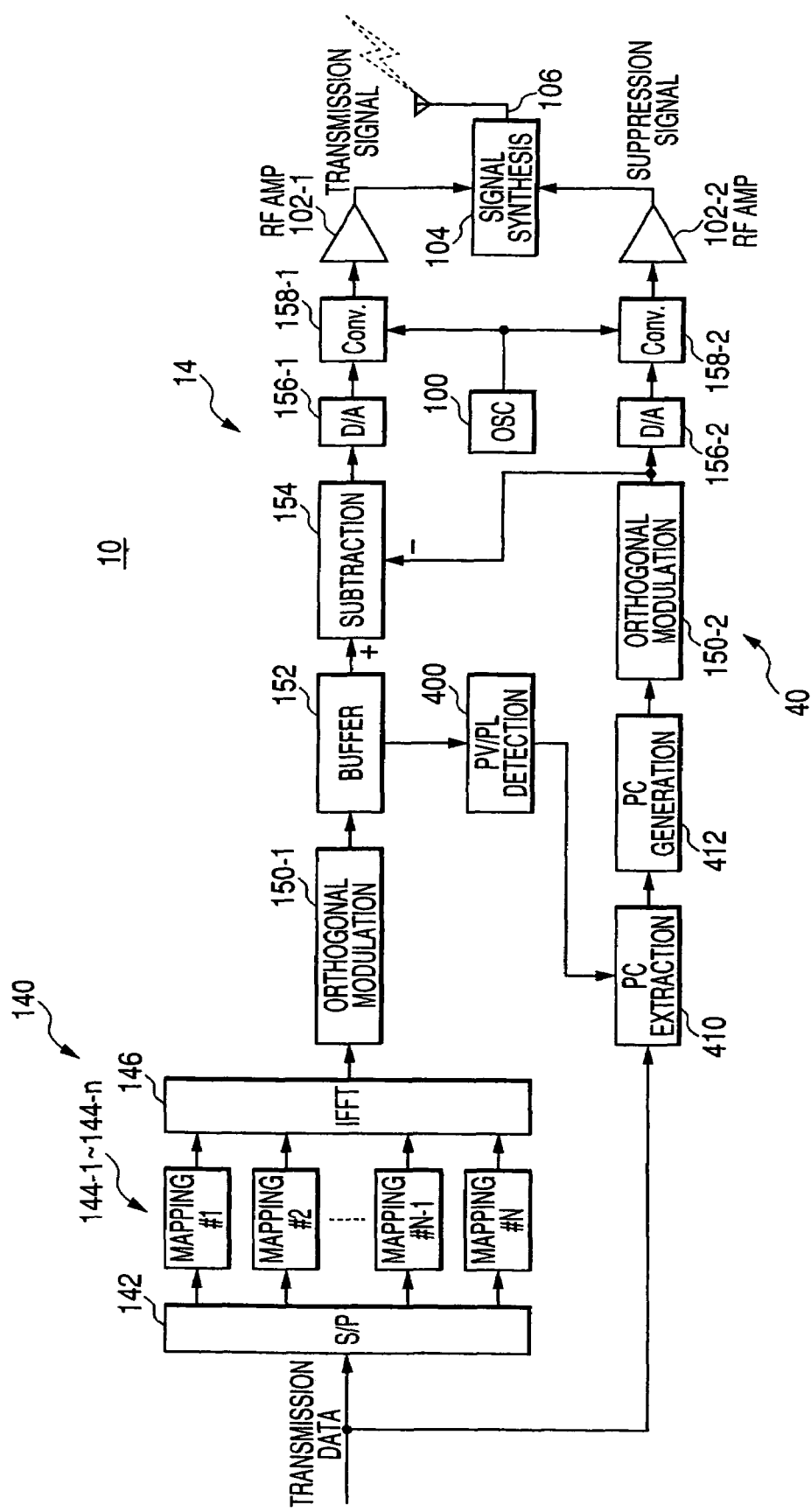
FIG. 4 is a diagram showing the structure of a first OFDM transmitter of the present invention.

FIG. 4 is a diagram showing the structure of a first OFDM transmitter 10 of the present invention.

As shown in FIG. 4, the first OFDM transmitter 10 includes the mapping/IFFT section 140, the local signal generation section 100, RF-AMPs $102_1$ and $102_2$, a signal synthesis section 104, the transmission antenna 106, a first transmission signal generation section 14, and a first peak suppression section 40.

The transmission signal generation section 14 is provided with an orthogonal modulation section $150_1$, a buffer section 152, a subtraction section 154, a D/A conversion section $156_1$, and a frequency conversion section $158_1$.

The peak suppression section 40 is provided with peak value/peak position (PV/PL) detection section 400, a peak carrier (PC) extraction section 410, a peak carrier generation section 412, an orthogonal modulation section $150_2$, a D/A conversion section $156_2$, and a frequency conversion section $158_2$.

With such components, the OFDM transmitter 10 transmits a transmission signal while performing amplitude peak suppression thereto. Here, the transmission signal includes N subcarriers, those of which are modulation results by digital symbols derived from the transmission data.

In the transmission signal generation section 14 of the OFDM transmitter 10, the orthogonal modulation section $150_1$ uses an IFFT sample coming from the mapping/IFFT section 140 to perform orthogonal modulation to derive an intermediate frequency, and outputs the result to the buffer section 152 as modulation data.

The buffer section 152 buffers the modulation data provided from the orthogonal modulation section $150_1$, and supplies the result to the subtraction section 154, and the PV/PL detection section 400 in the peak suppression section 40 for processing therein.

From the modulation data provided from the buffer section 152, the subtraction section 154 subtracts peak suppression data, and outputs the result to the D/A conversion section $156_1$. Here, the peak suppression data is the one provided from the peak carrier generation section 412 of the peak suppression section 40.

The D/A conversion section $156_1$ converts, from digital to analog, the modulation data coming from the subtraction section 154, and outputs the result to the frequency conversion section $158_1$.

The frequency conversion section $158_1$ converts the frequency of the transmission signal coming from the D/A conversion section $156_1$, and outputs the conversion result to the RF-AMP $102_1$. For such frequency conversion, used is a local signal whose absolute phase is the same as that of the local signal that comes from the local signal generation section 100 to the frequency conversions section $158_2$ in the peak suppression section 40.

The RF-AMP $102_1$ power-amplifies the transmission signal coming from the D/A conversion section $156_1$, and outputs the result to the signal synthesis section 104.

In the peak suppression section 40, the PV/PL detection section 400 processes the modulation data as a result of buffering to the buffer section 152, and detects an amplitude peak value (refer to FIG. 3) of the modulation data, and the position thereof.

The PV/PL detection section 400 outputs the detection result to the peak carrier extraction section 410.

The amplitude increase (FIG. 3) observed in the modulation data (transmission data) is caused by a plurality of subcarriers overlaying on one another. The subcarriers are those having almost the same phase.

Accordingly, eliminating such subcarriers from the modulation data (transmission data) at the peak position will reduce the peak value.

Specifically, among such subcarriers, eliminating any large-amplitude subcarriers at the peak position will reduce the peak value to a large extent. On the other hand, eliminating any small-amplitude subcarriers at the peak position will not reduce the peak value that much.

From the subcarriers having the same phase as the peak detected by the PV/PL detection section 400, the peak carrier extraction section 410 extracts L (e.g., L is about N/4) subcarriers in decreasing order of peak amplitude. After extraction as such, the peak carrier extraction section 410 outputs frequency information about thus extracted subcarriers, and digital symbols corresponding thereto.

The peak carrier generation section 412 then generates peak suppression data that includes those L subcarriers extracted by the peak carrier extraction section 410.

Similarly to the mapping/IFFT section 140, the peak carrier generation section 412 may go through inverse fast Fourier transform processing exemplified by butterfly computation. In this example, the peak suppression data is generated by addition of data derived by modulating (complex-multiplying) waveform data of the L subcarriers using their corresponding digital symbols. The resulting peak suppression data is forwarded to the orthogonal modulation section $150_2$.

Note here that the waveform data of a subcarrier is generated by sine waveform reading in accordance with the frequency of the subcarrier, for example. The sine waveforms are those stored in ROM in advance.

The orthogonal modulation section $150_2$ uses the peak suppression data coming from the peak carrier generation section 412 to subject the intermediate frequency to orthogonal modulation. The result is then forwarded, as suppression modulation data, to both the subtraction section 154 and the D/A conversion section $156_2$.

Here, there is no need to include the orthogonal modulation section $150_2$ when the peak carrier generation section 412 directly generates the peak suppression data of a real waveform using the subcarriers modulated into the intermediate frequency.

The D/A conversion section $156_2$ converts the digital suppression modulation data provided from the orthogonal modulation section $150_2$ to an analog peak suppression signal, and outputs the result to the frequency conversion section $158_2$ with a timing synchronous with the D/A conversion section $156_1$.

The frequency conversion section $158_2$ converts the frequency of the peak suppression signal, and outputs the result to the RF-AMP $102_2$. For such frequency conversion, used is a local signal coming from the local signal generation section 100, and having the same absolute phase as the local signal in the frequency conversions section $158_1$.

The RF-AMP $102_2$ amplifies the peak suppression signal coming from the frequency conversion section $158_2$, and outputs the result to the signal synthesis section 104.

The signal synthesis section 104 adds the transmission signal coming from the RF-AMP $102_1$ and the peak suppression signal coming from the RF-AMP $102_2$ for signal synthesis. The result is then sent out toward the wireless communications line as a final transmission signal via the transmission antenna 106.

Here, the path delay is so adjusted, as appropriate, that the delay time (phase) from the D/A conversion section $156_1$ becomes equal to that from the D/A conversion section $156_2$.

(Peak Suppression Operation in OFDM Transmitter 10)

Described below is the comprehensive operation for peak suppression in the first OFDM transmitter 10.

Figure 5:
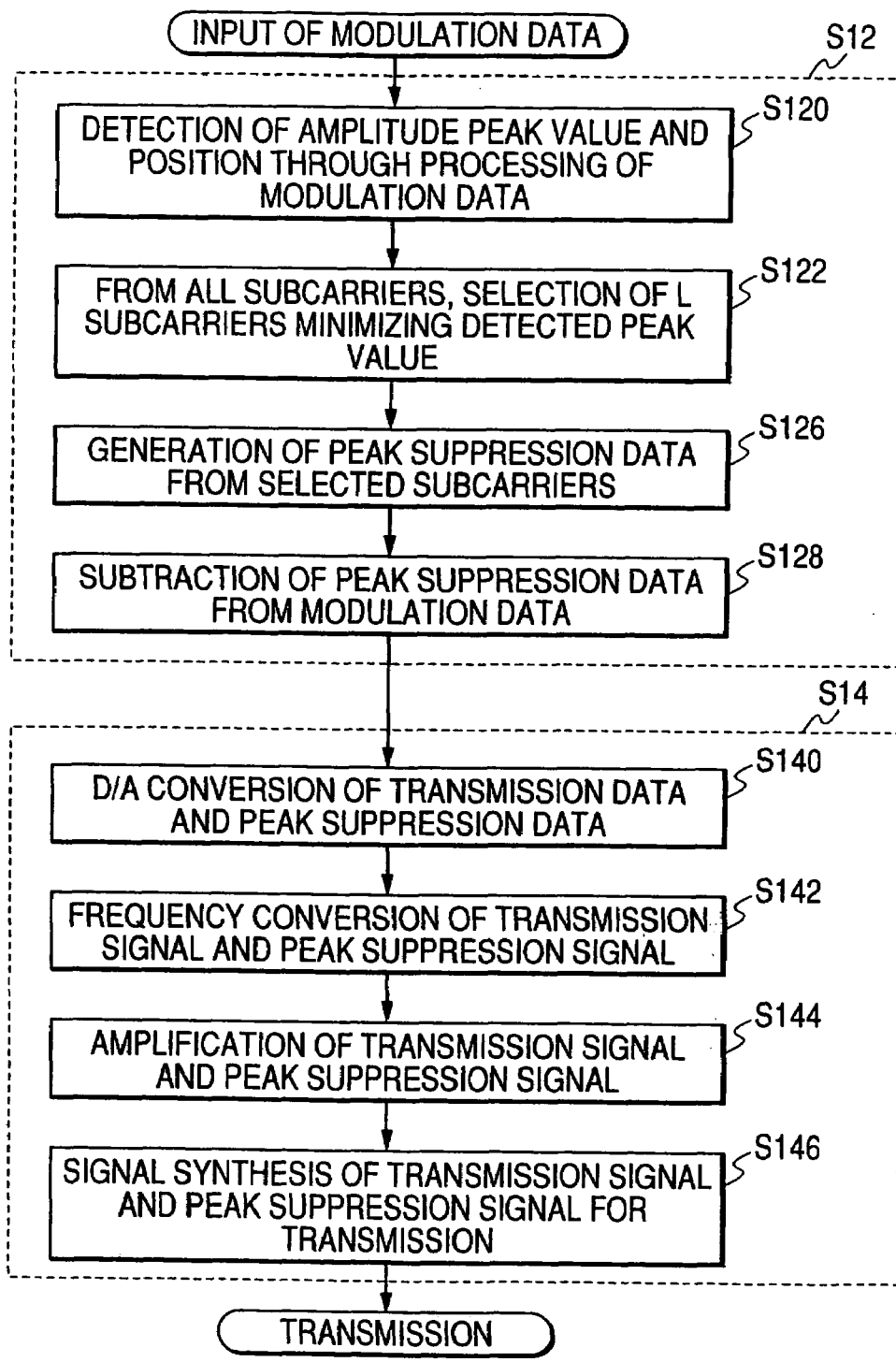
FIG. 5 is a flowchart showing the operation of the first OFDM transmitter of FIG. 4.

FIG. 5 is a flowchart showing the operation of the first OFDM transmitter 10 of FIG. 4.

As shown in FIG. 5, in step S120 of first-stage peak suppression (S12), when modulation data comes from the orthogonal modulation section $150_1$, the PV/PL detection section 400 responsively processes the modulation data to detect a peak value (e.g., FIG. 3) and the position thereof.

In step S122, from all of the subcarriers, the peak carrier extraction section 410 extracts L of those subcarriers with which the detected peak can be minimized.

In step S124, the peak carrier generation section 412 uses thus extracted subcarriers and transmission data to generate peak suppression data.

In step S126, the subtraction section 154 in the transmission signal generation section 14 subtracts the peak suppression data from the modulation data.

Figure 6:
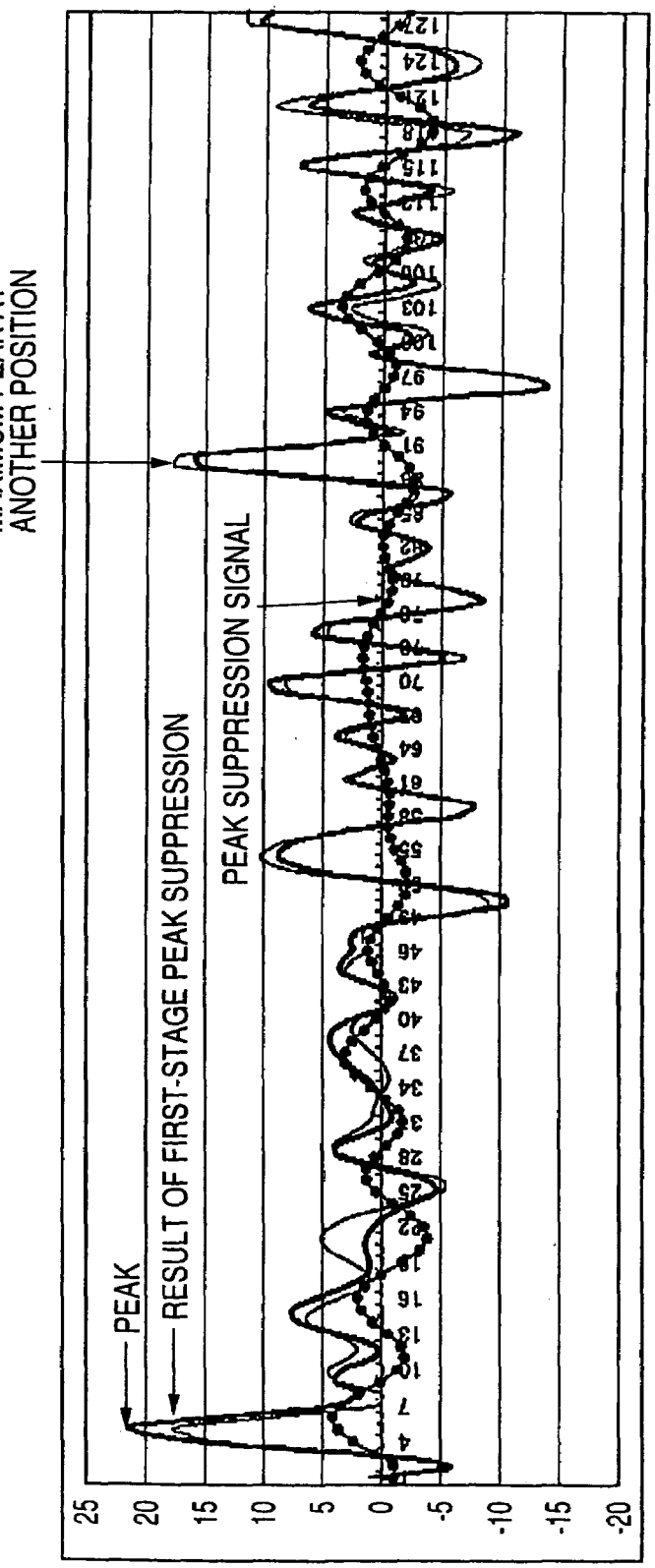
FIG. 6 is a diagram exemplarily showing the amplitude of modulation data as a result of first-stage peak suppression (S12) shown in FIG. 5.

FIG. 6 is a diagram exemplarily showing the amplitude of the modulation data as a result of first-stage peak suppression (S12) shown in FIG. 5.

Figure 7:
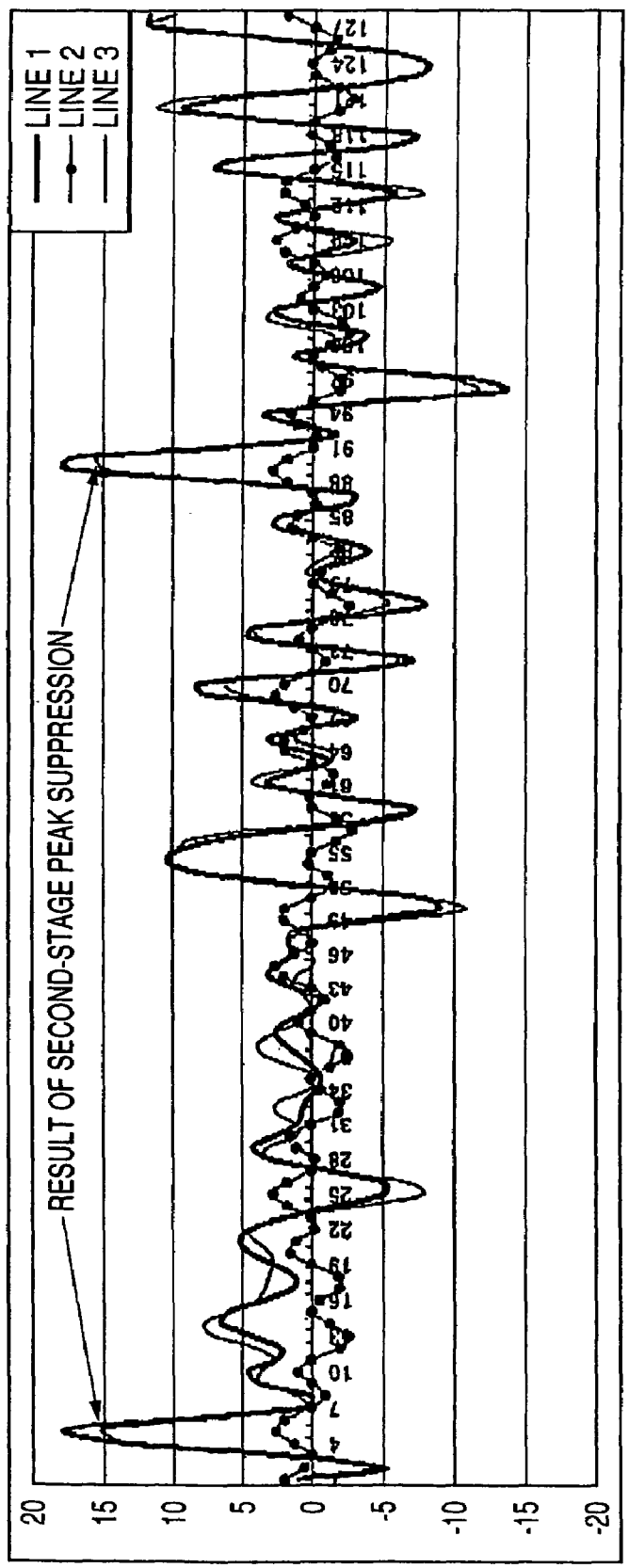
FIG. 7 is a diagram exemplarily showing the amplitude of a transmission signal as a result of second-stage peak suppression (S14) shown in FIG. 5.

In FIGS. 6 and 7 that will be described below, exemplified is a case where two subcarriers are subjected to peak suppression (with L=2).

As described in the foregoing, subtracting the peak suppression data from the modulation data will reduce the peak value (FIG. 3) detected by the peak carrier extraction section 410 as shown in FIG. 6. Here, the modulation data is the one buffered to the buffer section 152 in the transmission signal generation section 14, and the peak suppression data is the one generated by the peak carrier generation section 412 in the peak suppression section 40.

The concern here is that subtracting the peak suppression data from the modulation data as such will increase the peak value whose amplitude was not the largest before the first-stage peak suppression. With this being the case, as shown in FIG. 6, it will result in another amplitude peak at another position.

For betterment, the second-stage peak suppression is performed as below.

In the second-stage peak suppression (S13), after the process of step S126, steps S122 to S126 are repeated.

By referring to FIG. 4, another set of the components, i.e., the buffer section 152, the subtraction section 154, the PV/PL detection section 400, the PC generation section 412, and the orthogonal modulation section $150_2$, is provided subsequent to the subtraction section 154 and the orthogonal modulation section $152_2$.

With such a structure, the outputs from those two orthogonal modulation sections $150_2$ are added together, serving as a peak suppression signal.

FIG. 7 is a diagram exemplarily showing the amplitude of the transmission signal as a result of the second-stage peak suppression (S14) shown in FIG. 5.

As shown in FIG. 7, with the second-stage peak suppression as described above, the peak (FIG. 3) detected by the peak carrier detection section 410, and the peak (FIG. 6) increased in amplitude by the first-stage peak suppression can be both reduced in amplitude.

Figure 8:
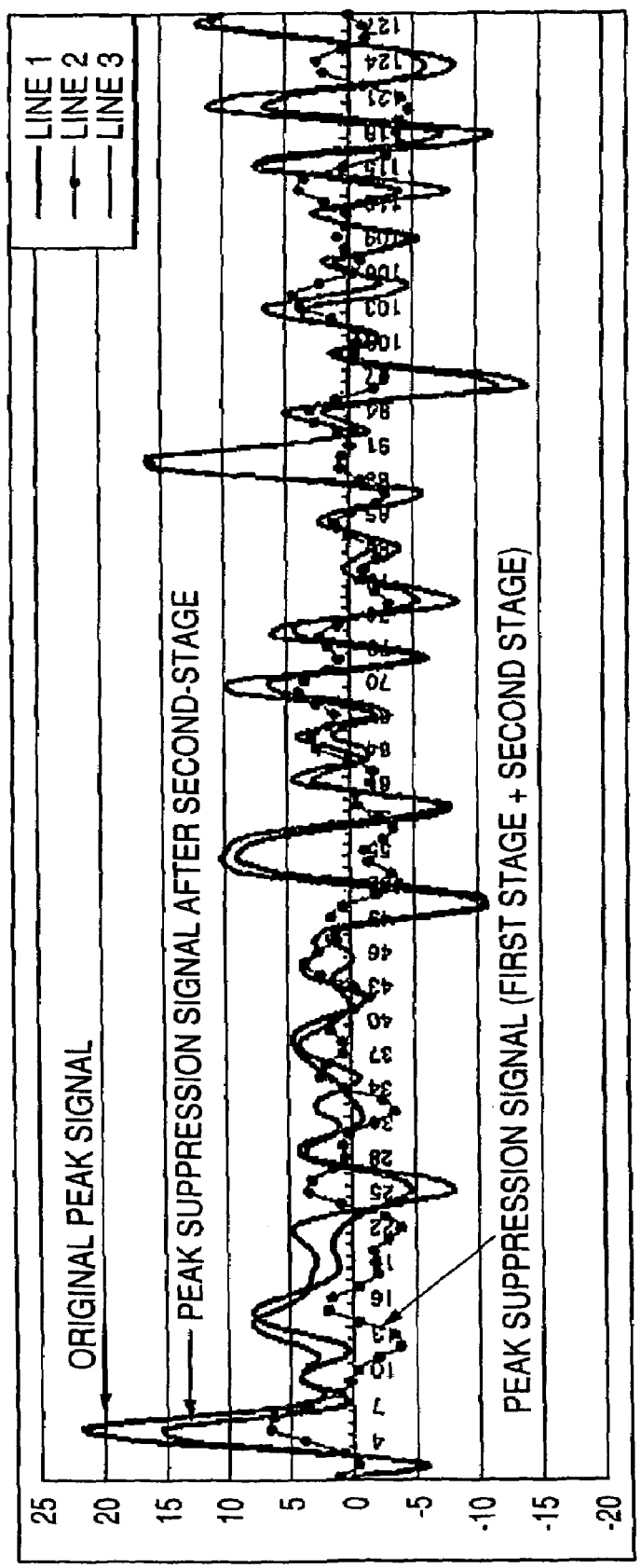
FIG. 8 is a diagram exemplarily showing the effects as a result of peak suppression by the first OFDM transmitter.

FIG. 8 is a diagram exemplarily showing the effects as a result of peak suppression by the first OFDM transmitter 10.

In the OFDM transmitter 10, assuming that N=32, and L=5 ($\approx$15% of the total number of subcarriers), as shown in FIG. 8, the resulting peak suppression effects will be of about 3.5 dB.

Accordingly, the RF-AMPs $102_1$ for amplifying transmission signals can have better efficiency for about 3.5 dB backoff, and the power consumption thereof will be ½.

What is more, compared with the RF-AMP $102_1$, the output power of the RF-AMP $102_2$ for amplifying peak suppression signals is still lower about 6 dB. This is because the number of carriers L in charge is 15% of the total number of carriers N.

Accordingly, even if the RF-AMPs $102_1$ and $102_2$ are both used, the total power consumption of the OFDM transmitter 10 is lower than that of the OFDM transmitter 8 of a general type (FIG. 1).

Note that the peak suppression method of the present invention includes various subcarriers other than OFDM, and is applicable in various amplitude peak suppression techniques depending on the phase relationship among such subcarriers.

SECOND EMBODIMENT

Described now is a second embodiment of the present invention.

Figure 9:
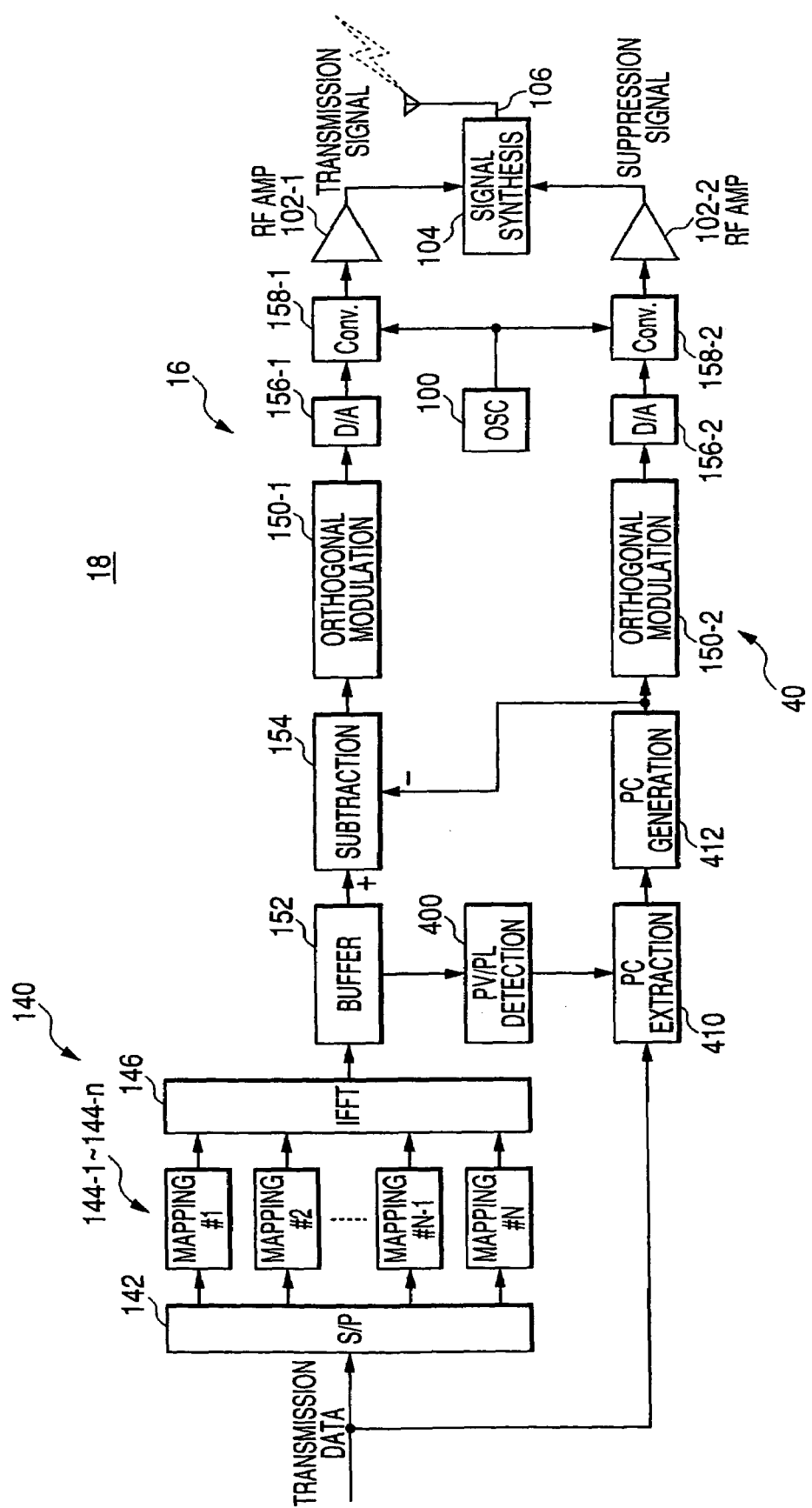
FIG. 9 is a diagram showing the structure of a second OFDM transmitter of the present invention.

FIG. 9 is a diagram showing the structure of a second OFDM transmitter 18 of the present invention.

As shown in FIG. 9, the second OFDM transmitter 18 includes the mapping/IFFT section 140, the local signal generation section 100, the RF-AMPs $102_1$ and $102_2$, the signal synthesis section 104, the transmission antenna 106, a second transmission signal generation section 16, and the first peak suppression section 40.

Although the second transmission signal generation section 16 is provided with the same components as in the first transmission signal generation section 14 (FIG. 4), a difference is observed in these two structures.

That is, unlike the first transmission signal generation section 14 including the orthogonal modulation section $150_1$ between the mapping/IFFT section 140 and the buffer section 152, the second transmission signal generation section 16 carries the orthogonal modulation section $150_1$ between the subtraction section 154 and the D/A conversion section $156_1$.

The second OFDM transmitter 18 uses such components to transmit, similarly to the first OFDM transmitter 10, a transmission signal while performing amplitude peak suppression thereto. Here, the transmission signal includes N subcarriers, those of which are modulation results by digital symbols derived from the transmission data.

In the transmission signal generation section 16 in the second OFDM transmitter 18, the buffer section 152 buffers an IFFT sample coming from the mapping/IFFT section 140, and outputs the result to both the PV/PL detection section 400 and the peak carrier extraction section 410.

From the IFFT sample coming from the buffer section 152, the subtraction section 154 subtracts the peak suppression data coming from the peak carrier generation section 412, and outputs the result to the orthogonal modulation section $150_1$.

The orthogonal modulation section $150_1$ subjects the IFFT sample coming from the subtraction section 154 to orthogonal modulation, and the resulting modulation data is output to the D/A conversion section $156_1$.

In the peak suppression section 40, the PV/PL detection section 400 processes the IFFT sample buffered to the buffer section 152, and detects a peak value (FIG. 3) and the position thereof in the transmission signal. The result is then forwarded to the peak carrier extraction section 410.

The peak carrier extraction section 410 extracts L (e.g., L is about N/4) subcarriers in decreasing order of peak amplitude from the subcarriers having the same phase as the peak detected by the PV/PL detection section 400.

The peak carrier generation section 412 then generates peak suppression data using the extraction result derived by the peak carrier extraction section 410 and the transmission data. Thus generated peak suppression data is then forwarded to both the subtraction section 154 and the orthogonal modulation section $150_2$.

Compared with the first OFDM transmitter 10, the components in the second OFDM transmitter 18, i.e., the buffer section 152, the subtraction section 154, and the PV/PL detection section 400, operate differently. Specifically, these components handle complex IFFT samples instead of modulation data, and this accordingly results in change of circuit and computation details.

(Peak Suppression Operation in OFDM Transmitter 18)

Described below is the comprehensive operation for peak suppression in the second OFDM transmitter 18.

Figure 10:
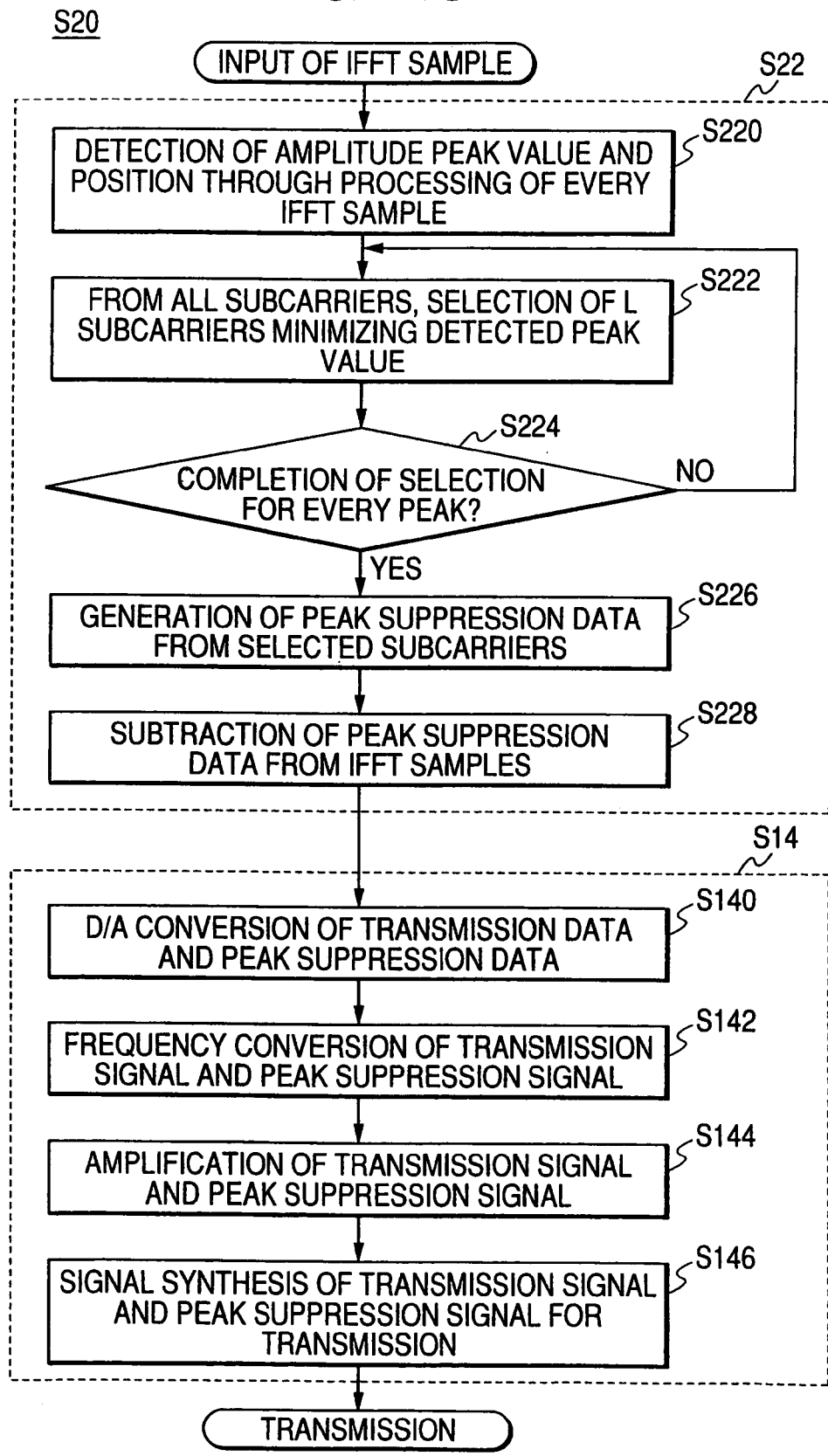
FIG. 10 is a flowchart showing the operation of the second OFDM transmitter of FIG. 9.

FIG. 10 is a flowchart showing the operation of the second OFDM transmitter 18 of FIG. 9.

As shown in FIG. 10, in step S220 of first-stage peak suppression (S22), when an IFFT sample comes from the mapping/IFFT section 140 via the buffer section 152, the PV/PL detection section 400 processes the IFFT sample so that a peak value (e.g., FIG. 3) and the position thereof are detected.

In step S222, from all of the subcarriers, the peak carrier extraction section 410 extracts L of those subcarriers with which the detected peak can be minimized.

In step S224, the peak carrier generation section 412 uses thus extracted subcarriers and transmission data to generate peak suppression data.

In step S226, the subtraction section 154 in the transmission signal generation section 16 subtracts the peak suppression data from the modulation data.

In subsequent steps, the second OFDM transmitter 18 goes through the second-stage peak suppression (S14) in the similar manner to the first OFDM transmitter 10.

The second OFDM transmitter 18 operates similarly to the first OFDM transmitter 10, favorably deriving similar effects (refer to FIGS. 3, and 6 to 8).

THIRD EMBODIMENT

Described now is a third embodiment of the present invention.

Figure 11:
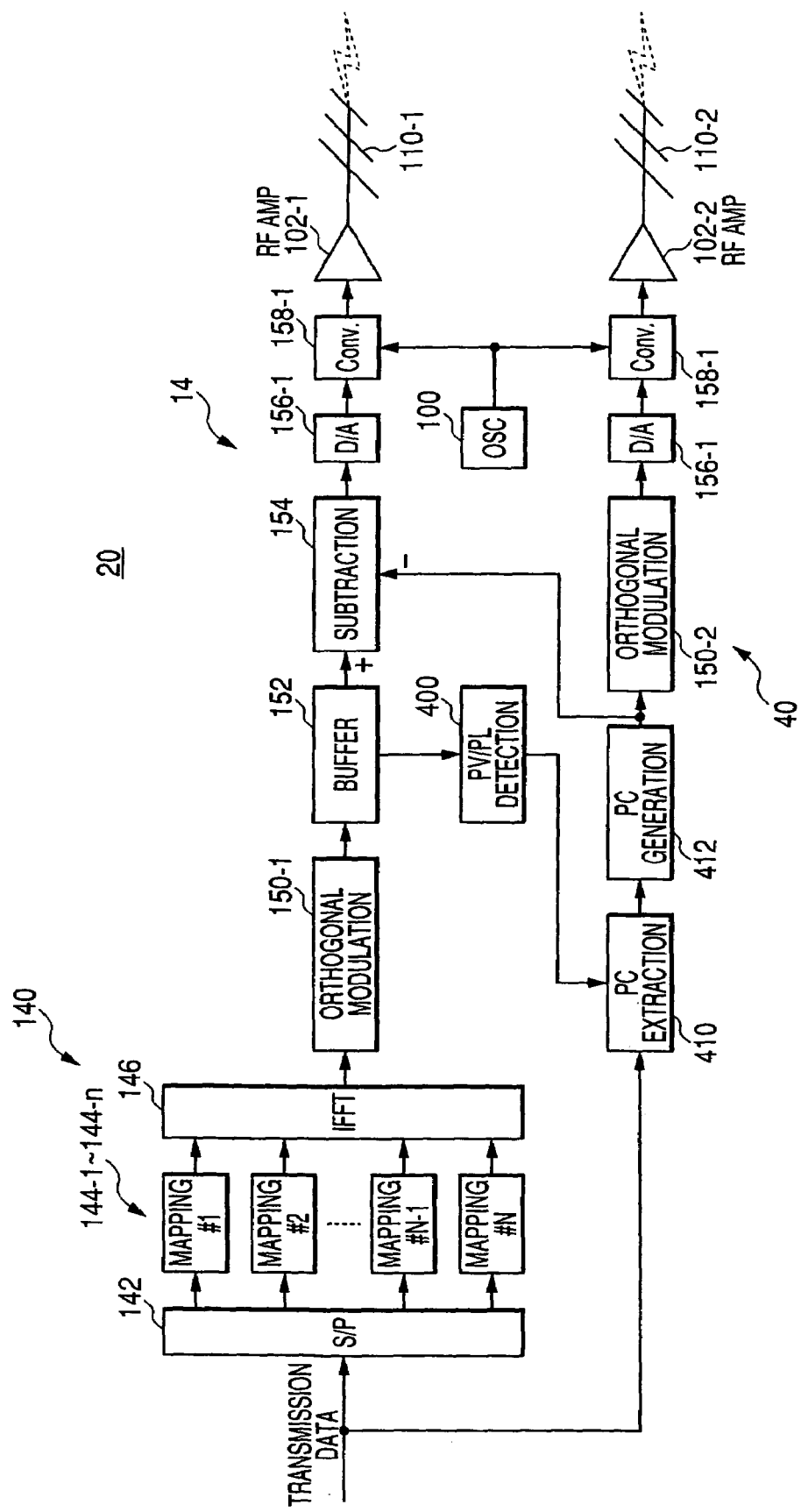
FIG. 11 is a diagram showing the structure of a third OFDM transmitter of the present invention.

FIG. 11 is a diagram showing the structure of a third OFDM transmitter 20 of the present invention.

As shown in FIG. 11, compared with the first OFDM transmitter 10 shown in FIG. 4, the third OFDM transmitter 20 includes neither the signal synthesis section 104 nor the transmission antenna 106, and directional transmission antennas $110_1$ and $110_2$ are connected on the output side of the RF-AMPs $102_1$ and $102_2$, respectively.

More in detail, in the third OFDM transmitter 20, the directional transmission antenna $110_1$ sends out a transmission signal, and the directional transmission antenna $110_2$ sends out a peak suppression signal. The transmission signal and the peak suppression signal are synthesized together not in the signal synthesis section 104 but over a wireless communications line.

The directional transmission antennas $110_1$ and $110_2$ are so oriented as to direct in the same direction for transmission, e.g., provided on the same plane that is perpendicular to the orientation direction.

The directional transmission antennas $110_1$ and $110_2$ receive transmission signals and peak suppression signals in such a manner that the phase relationship will be the same in the orientation direction.

In the structure that the directional transmission antennas $110_1$ and $110_2$ are placed as such for supply of transmission signals and peak suppression signals, the signal source looks as if being a single transmission antenna from some distance away, i.e., generally the distance of 10 times the space between the directional transmission antennas $110_1$ and $110_2$ or more.

The directional transmission antennas $110_1$ and $110_2$ may be each provided with a plurality of antennas.

With this being the case, such antennas provided to the directional transmission antennas $110_1$ and $110_2$ are to be placed circular to be nondirectional.

Similarly to the first OFDM transmitter 10 (FIG. 4), the third OFDM transmitter 20 may perform the first-stage peak suppression (S12; FIG. 5). If this is the case, in the first-stage peak suppression, the first and second largest amplitude peaks may be detected, and carrier selection may be so performed that the first largest peak is attenuated, but at least the second largest peak is not increased in amplitude. After the first-stage peak suppression, the second-stage peak suppression may be skipped.

The third OFDM transmitter 20 favorably eliminates any signal synthesis loss in the synthesis section 140.

FOURTH EMBODIMENT

Described now is a fourth embodiment of the present invention.

Figure 12:
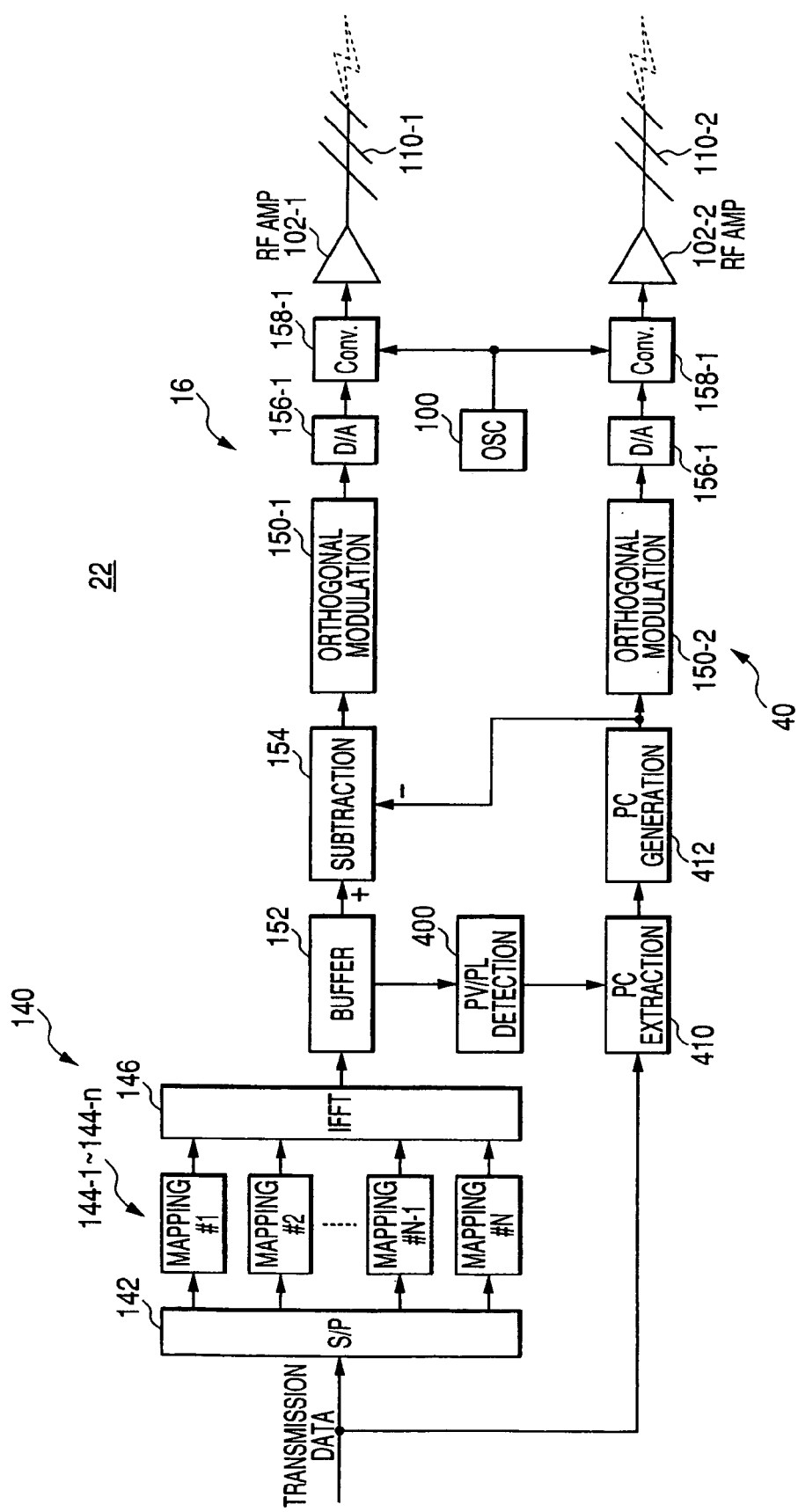
FIG. 12 is a first diagram showing the structure of a fourth OFDM transmitter of the present invention.

FIG. 12 is a first diagram showing the structure of a fourth OFDM transmitter 22 of the present invention.

Figure 13:
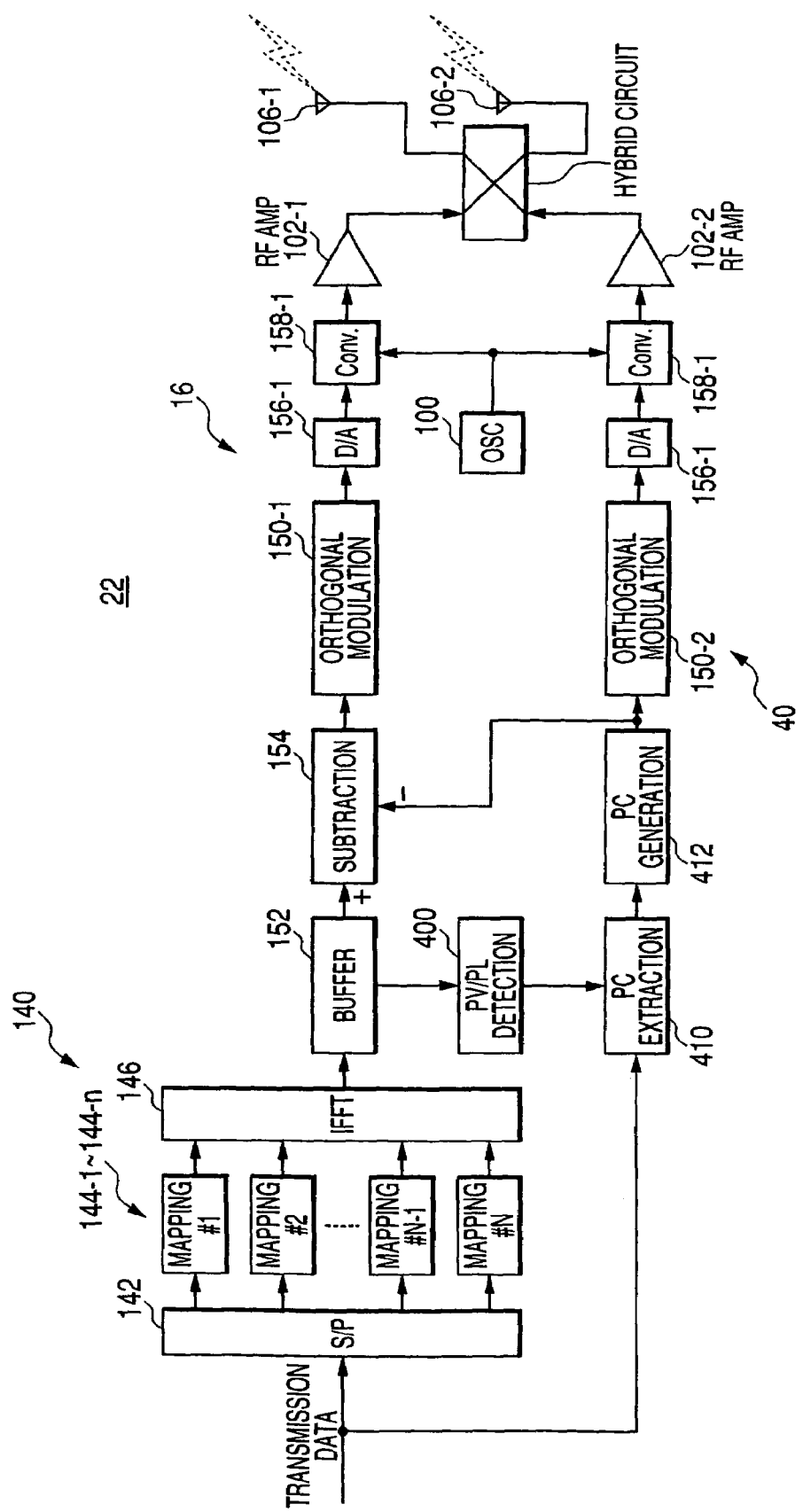
FIG. 13 is a second diagram showing the structure of the fourth OFDM transmitter of the present invention.

FIG. 13 is a second diagram showing the structure of the fourth OFDM transmitter 22 of the present invention.

As shown in FIG. 12, compared with the second OFDM transmitter 18 of FIG. 9, the fourth OFDM transmitter 22 includes neither the signal synthesis section 104 nor the transmission antenna 106, and the directional transmission antennas $110_1$ and $110_2$ are connected on the output side of the RF-AMPs $102_1$ and $102_2$, respectively.

More in detail, similarly to the third OFDM transmitter 20 (FIG. 11), in the fourth OFDM transmitter 22, the directional transmission antenna $110_1$ sends out a transmission signal, and the directional transmission antenna $110_2$ sends out a peak suppression signal. The transmission signal and the peak suppression signal are synthesized together not in the signal synthesis section 104 but over a wireless communications line.

As shown in FIG. 13, the fourth OFDM transmitter 22 may be provided with a hybrid circuit between the RF-AMPs $102_1$ and $102_2$, and the transmission antennas $106_1$ and $106_2$.

With this being the case, output signals coming from the RF-AMPs $102_1$ and $102_2$ are to have the ratio of 1:1 for signal synthesis and splitting for supply to the transmission antennas $106_1$ and $106_2$.

FIFTH EMBODIMENT

Described now is a fifth embodiment of the present invention.

Figure 14:
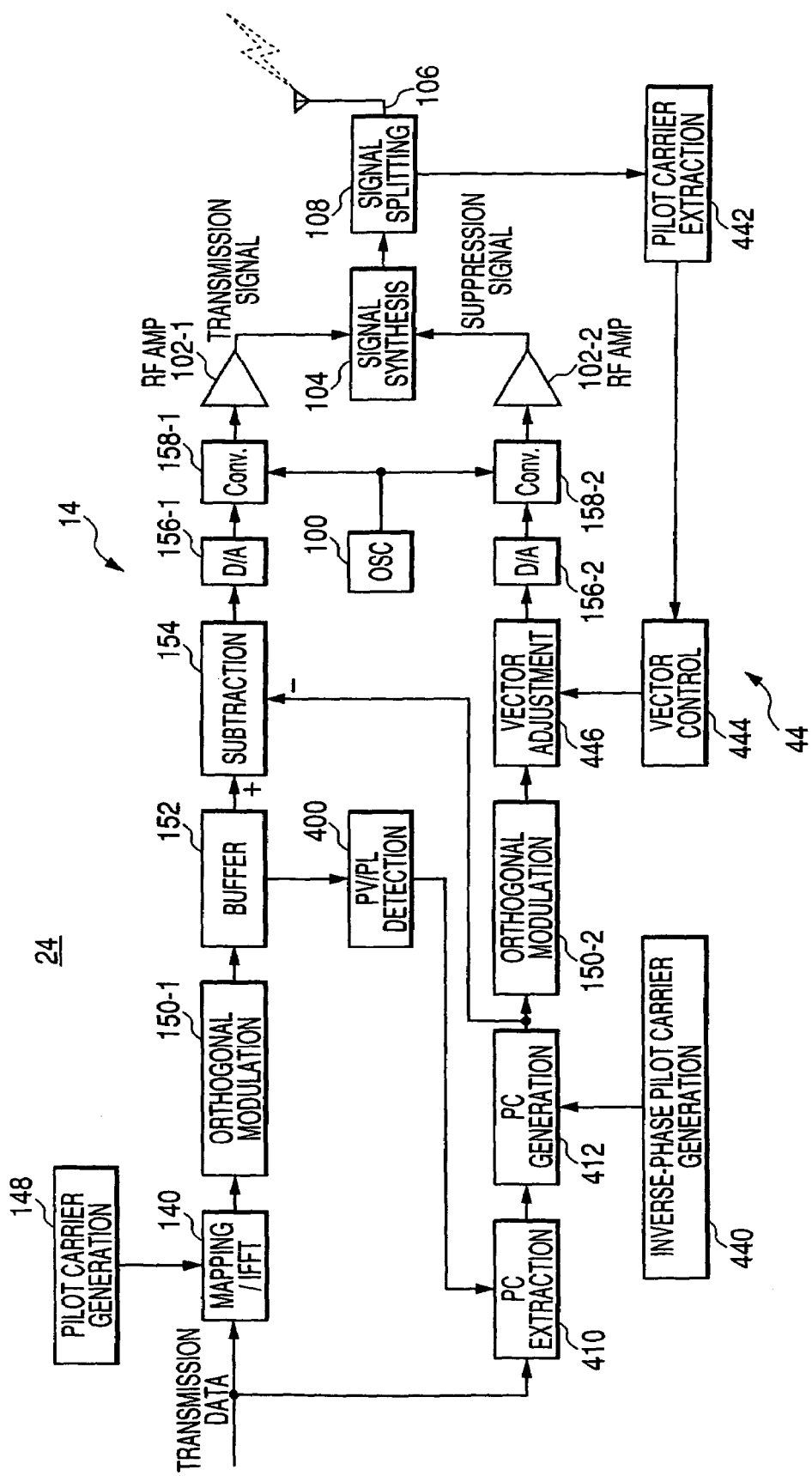
FIG. 14 is a diagram showing the structure of a fifth OFDM transmitter of the present invention.

FIG. 14 is a diagram showing the structure of a fifth OFDM transmitter 24 of the present invention.

As shown in FIG. 14, the fifth OFDM transmitter 24 is provided with the mapping/IFFT section 140, a pilot carrier generation section 148, the first transmission signal generation section 14, a third peak suppression section 44, the RF-AMPs $102_1$ and $102_2$, the signal synthesis section 104, a signal splitting section 108, and the transmission antenna 106.

Compared with the first peak suppression section 40 (FIG. 4), the peak suppression section 44 additionally includes an inverse phase pilot carrier generation section 440, a pilot carrier extraction section 442, a vector control section 444, and a vector adjustment section 446.

The OFDM transmitter 24 detects and corrects any phase and amplitude errors possibly occurs between a transmission signal and a peak suppression signal using a pilot carrier that is provided for such a detection purpose, whereby the amplitude increase of the transmission signal can be suppressed with higher accuracy.

Exemplified in the first to fourth OFDM transmitters 10, 18, 20, and 22 is a case where a transmission signal includes N subcarriers. In the fifth OFDM transmitter 24, another subcarrier, e.g., 0th subcarrier not for the use of data transmission, is used as a pilot carrier for error detection between a transmission signal and a peak suppression signal.

The pilot carrier generation section 148 operates as the mapping section 144 (e.g., FIG. 4) for mapping the 0th carrier so as to map any predetermined data to the pilot carrier. The result is then forwarded to the IFFT section 146.

With respect to the IFFT sample attached with the pilot carrier, the transmission signal generation section 14 executes the process similarly to the first and third OFDM transmitters 10 and 20 (FIGS. 4 and 11) so that a transmission signal is generated.

The signal splitting section 108 splits a part of the transmission signal provided from the signal synthesis section 104, and the result is then forwarded to the pilot carrier detection section 442.

In the peak suppression section 44, the inverse pilot carrier generation section 440 generates an inverse pilot carrier whose phase is opposite to the pilot carrier. Thus generated inverse pilot carrier is forwarded to the peak carrier generation section 412.

The peak carrier generation section 412 generates peak suppression data including L subcarriers extracted by the peak carrier extraction section 410, and the inverse pilot carrier provided from the inverse pilot carrier generation section 440.

The orthogonal modulation section $150_2$ subjects, to orthogonal modulation, the peak suppression data provided by the peak carrier generation section 412, and thus generated peak suppression modulation data is forwarded to the vector adjustment section 446.

From the transmission signal allocated by the signal splitting section 108, the pilot carrier detection section 442 extracts a signal corresponding to the pilot carrier.

Following the control exercised by the vector control section 444, the vector adjustment section 446 adjusts the amplitude and phase of the suppression modulation data provided from the orthogonal modulation section $150_2$.

The vector control section 444 exercises control over the vector adjustment section 446 to control the amplitude and phase of the peak suppression modulation data provided from the orthogonal modulation section $150_2$ so as to minimize (preferably 0) the strength of the signal corresponding to the pilot carrier coming from the pilot carrier detection section 442.

For the vector control section 444 to control the amplitude and phase of the peak suppression modulation data as such, value change will do for a coefficient for computation use in the vector adjustment section 446.

An algorithm for such a coefficient change may be perturbation, for example.

To be specific, the suppression modulation data is changed in amplitude and phase little by little, and any direction reducing the signal corresponding to the pilot carrier is thus searched. Along thus found direction, the phase and amplitude are corrected little by little.

The number of pilot carrier is not restrictive to 1, and for example, may be two for provision on both sides of the bandwidth, or may be more.

According to the fifth OFDM transmitter 24, the peak suppression can be implemented with more efficiency and accuracy compared with the first to fourth OFDM transmitters 10, 18, 20, and 22.

SIXTH EMBODIMENT

Described now is a sixth embodiment of the present invention.

Figure 15:
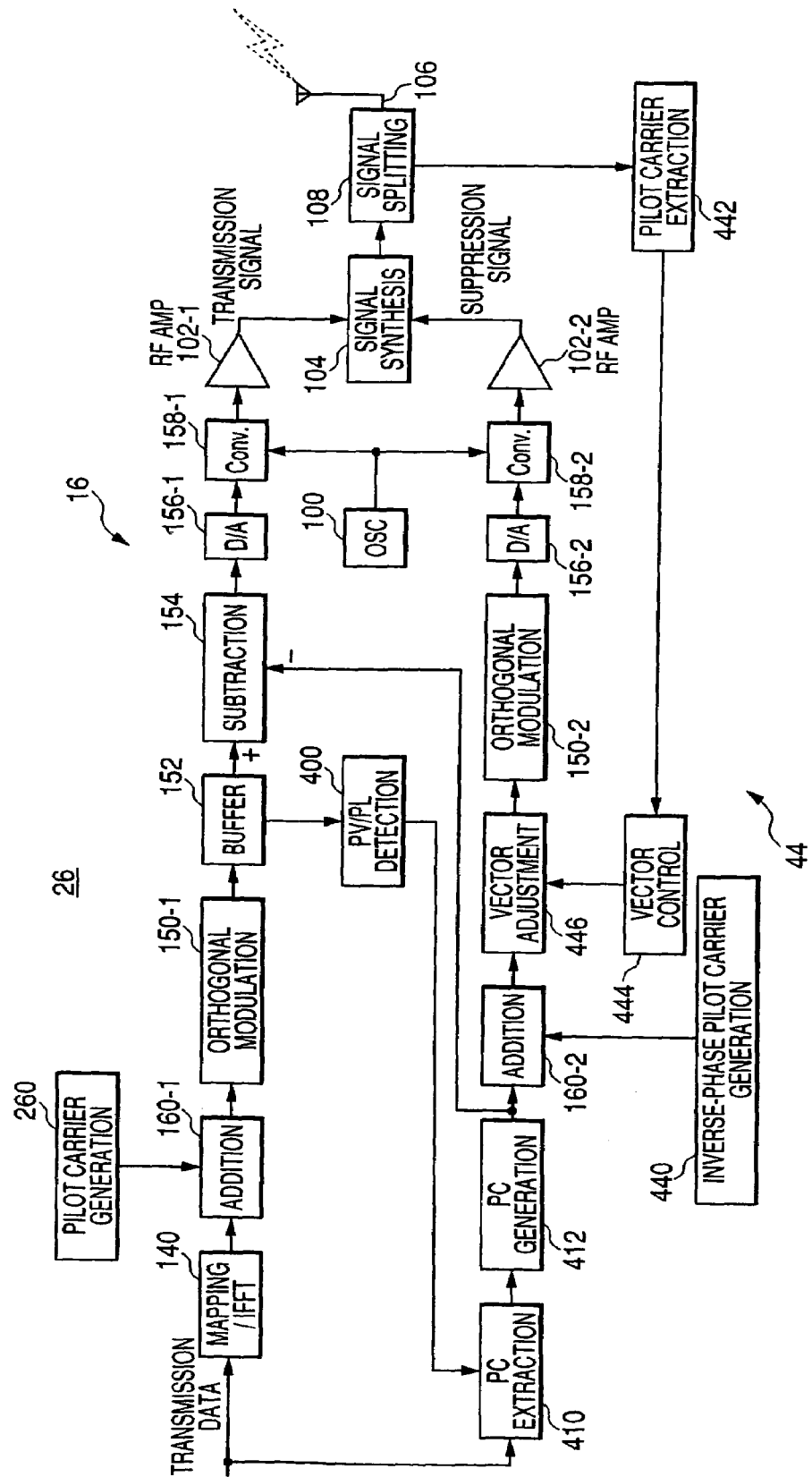
FIG. 15 is a diagram showing the structure of a sixth OFDM transmitter of the present invention.

FIG. 15 is a diagram showing the structure of a sixth OFDM transmitter 26 of the present invention.

As shown in FIG. 15, the fifth OFDM transmitter 26 includes the mapping/IFFT section 140, addition sections $160_1$ and $160_2$, the second transmission signal generation section 16, a pilot carrier generation section 260, the third peak suppression section 44, the RF-AMPs $102_1$ and $102_2$, the signal synthesis section 104, the signal splitting section 108, and the transmission antenna 106.

Similarly to the fifth OFDM transmitter 24 (FIG. 14), the sixth OFDM transmitter 26 uses a pilot carrier to perform peak suppression to a transmission signal with much higher accuracy.

The pilot carrier generation section 260 generates data corresponding to a pilot carrier, and outputs the result to the addition section $160_1$.

The addition section $160_1$ adds the data of the pilot carrier coming from the pilot carrier generation section 260, and an IFFT sample coming from the mapping/IFFT section 140. The addition result is forwarded to the transmission signal section 16.

The transmission signal generation section 16 executes a process to the addition value provided by the addition section $160_1$ in a similar manner to the second and fourth OFDM transmitters 18 and 22 (FIGS. 9 and 12).

In the peak suppression section 44, the inverse pilot carrier generation section 440 generates peak suppression modulation data corresponding to an inverse pilot carrier having the phase opposite to the pilot carrier, and outputs the result to the addition section $160_2$.

The addition section $160_2$ adds the data of the peak suppression modulation data corresponding to the inverse pilot carrier provided from the inverse pilot carrier generation section 440, and the peak suppression modulation data provided from the peak carrier generation section 412. The addition result is then forwarded to the vector adjustment section 446.

The pilot carrier detection section 442 extracts a signal corresponding to the pilot carrier from the transmission signal allocated by the signal splitting section 108.

Following the control exercised by the vector control section 444, the vector adjustment section 446 adjusts, in amplitude and phase, the addition value (peak suppression data) provided from the addition section $160_2$.

The vector control section 444 exercises control over the vector adjustment section 446 to control the amplitude and phase of the peak suppression modulation data provided by the orthogonal modulation section $150_2$ so as to minimize (preferably 0) the strength of the signal corresponding to the pilot carrier coming from the pilot carrier detection section 442.

For the vector control section 444 to control the amplitude and phase of the peak suppression modulation data, value change will do for a coefficient for computation use in the vector adjustment section 446. An algorithm for such a coefficient change may be perturbation, for example.

The orthogonal modulation section $150_2$ subjects, to orthogonal modulation, the peak suppression modulation data having been adjusted by the vector adjustment section 446.

According to the sixth OFDM transmitter 26, the peak suppression can be implemented with the level of efficiency and accuracy similar to the fifth OFDM transmitter 24, and higher than the first to fourth OFDM transmitters 10, 18, 20, and 22.

SEVENTH EMBODIMENT

Described now is a seventh embodiment of the present invention.

Figure 16:
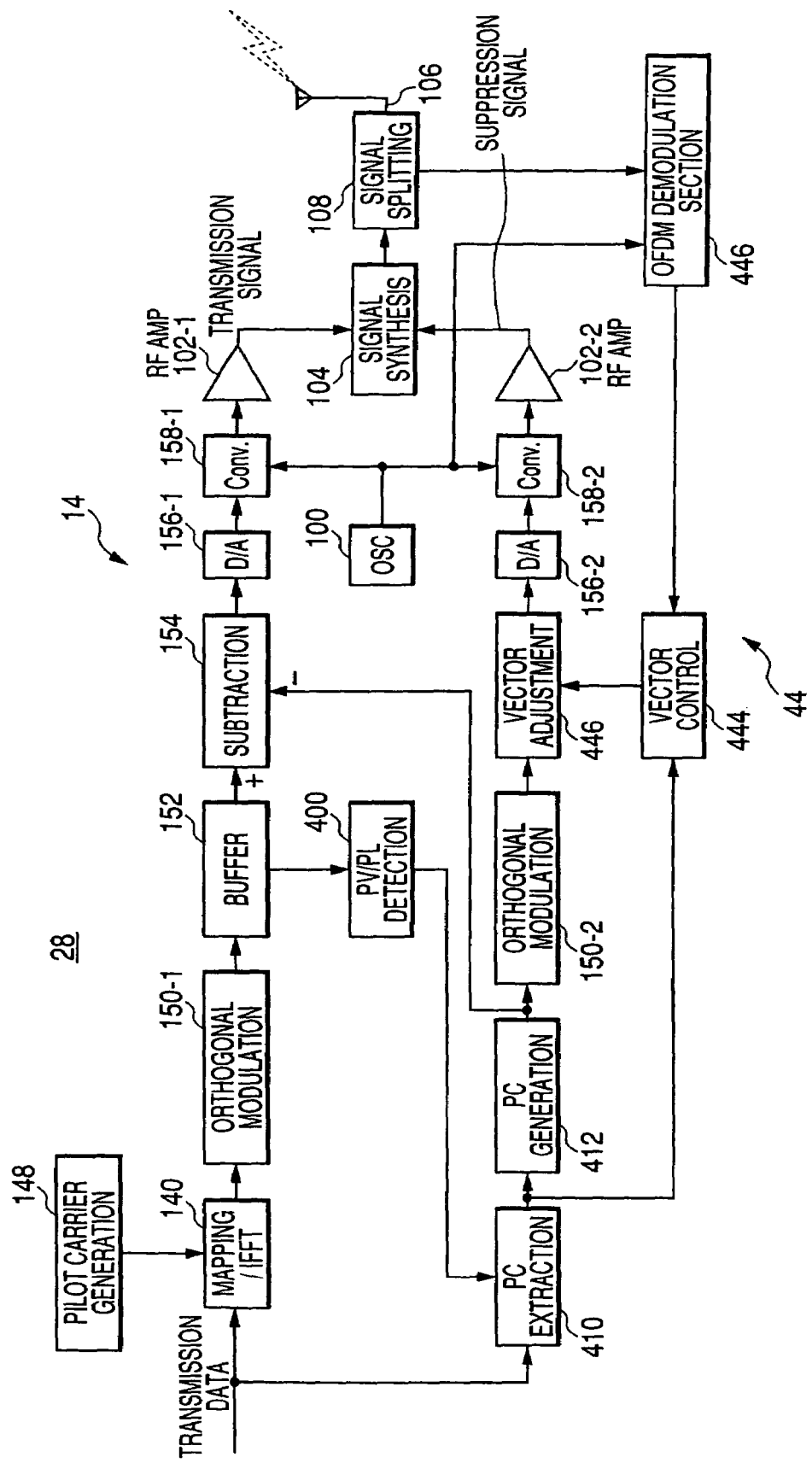
FIG. 16 is a diagram showing the structure of a seventh OFDM transmitter of the present invention.

FIG. 16 is a diagram showing the structure of a seventh OFDM transmitter 28 of the present invention.

Compared with the fifth OFDM transmitter 24 of FIG. 14, the seventh OFDM transmitter 28 includes neither the pilot carrier generation section 148 nor the inverse pilot carrier generation section 440, and includes the OFDM modulation section 446 as an alternative to the pilot carrier extraction section 442.

In such a seventh OFDM transmitter 28, the OFDM modulation section 446 converts a transmission signal allocated by the signal splitting section 108 into an intermediate frequency, and applies OFDM modulation to every subcarrier. Thus derived demodulation symbols of the subcarriers are forwarded to the vector control section 444.

From thus provided symbols of the subcarriers, the vector control section 444 arbitrarily selects the carriers extracted and not-extracted by the PC extraction section 410, one or more for each.

For each of the selected extracted- and not-extracted-carriers, the vector control section 444 calculates a ratio (complex) between before-modulation symbols and demodulation symbols for use in the mapping/IFFT section 140, and averages the result.

Moreover, the vector control section 444 updates the control amount (phase/amplitude) of the vector adjustment section 446 in such a manner that the calculated ratio will become 1:1.

For update as such, for example, the value derived by multiplying the current control amount by the ratio with some weighing is used as the next control amount.

The present invention is applicable for generation of multicarrier transmission signals.

What is claimed is:

1. A signal generator, comprising:
   first data generation means for generating first digital data including a plurality of modulated subcarriers for transmission;
   second data generation means for generating second digital data corresponding to the subcarriers of the first digital data that causes an amplitude increase to an analog signal as a result of converting the first digital data into analog;
   third data generation means for generating third data by subtracting the second digital data from the first digital data;
   first signal generation means for generating a first signal by converting the second digital data into an analog signal;
   second signal generation means for generating a second signal by converting the third data into an analog signal; and
   signal synthesis means for synthesizing the first and second signals.

* * * * *